United States Patent [19]

Cassity

[11] Patent Number: 4,749,035

[45] Date of Patent: Jun. 7, 1988

[54] TUBING PACKER

[75] Inventor: Thomas G. Cassity, Katy, Tex.

[73] Assignee: Cameron Iron Works USA, Inc., Houston, Tex.

[21] Appl. No.: 44,414

[22] Filed: Apr. 30, 1987

[51] Int. Cl.$^4$ ............................................. E21B 33/128
[52] U.S. Cl. ..................... 166/120; 166/187; 166/191; 166/212; 166/217; 277/103; 277/117; 277/236
[58] Field of Search ............... 166/187, 120, 122, 134, 166/179, 195, 212, 217, 191; 277/236, 118, 116.6, 103, 117, 208, 189, 190, 191; 285/100–102, 104, 106, 107, 382, 382.1, 382.2, 382.4, 382.5, 315, 140, 139

[56] References Cited

U.S. PATENT DOCUMENTS

| | | | |
|---|---|---|---|
| 2,159,640 | 5/1939 | Strom | 285/101 X |
| 2,582,700 | 1/1952 | Jones | |
| 2,953,406 | 9/1960 | Young | 166/217 |
| 4,302,018 | 11/1981 | Harvey et al. | 277/236 X |
| 4,556,224 | 12/1985 | Le | 277/118 |
| 4,573,537 | 3/1986 | Hirajuna et al. | 277/236 X |
| 4,588,029 | 5/1986 | Blizzard | 166/120 |
| 4,646,845 | 3/1987 | Boeker | 166/387 |
| 4,662,663 | 5/1987 | Schmitz | 285/382.5 |
| 4,665,979 | 5/1987 | Boehm, Jr. | 277/117 X |

Primary Examiner—Stephen J. Novosad
Assistant Examiner—Hoang C. Dang
Attorney, Agent, or Firm—Vinson & Elkins

[57] ABSTRACT

An improved tubing packer including a sleeve connected in the tubing string and having an outer diameter close to the inner diameter of the string into which it is to seal and a plurality of external grooves having pressure compensating material therein, a liner within the sleeve and spaced therefrom, pressure responsive piston between said sleeve and said liner, the pressure responsive piston and said sleeve having coacting multiple camming surfaces which coact to force the sleeve outward into tight gripping and sealing engagement with the interior of the well string and a source of pressure fluid supplied to the pressure responsive piston.

10 Claims, 3 Drawing Sheets

TUBING PACKER

BACKGROUND

The present invention relates to an improved device which is positioned within a well bore in surrounding relationship to a tubing string to seal across the annulus between the interior of the well casing and the exterior of the tubing string.

Prior tubing packers have included an annular resilient packer which is positioned between shoulders which can be moved toward each other to compress the packer axially so that it expands radially inward and outward into sealing engagement and also includes anchors which secure the packer structure at a particular level in the casing. An example of such a packer is shown in U.S. Pat. No. 2,387,003. Many types of packers have been available. Some packers are set by movement of the tubing string. Others are set by hydraulic pressure transmitted to the packer.

Annular wellhead seals have included seals which seal across the annulus between a housing and a well string. Some of these seal have included seals with legs which are wedged outward toward their respective sealing surfaces as shown in U.S. Pat. No. 4,131,287. One seal includes the wedging of the legs into serrations in the sealing surface. This structure is shown in U.S. Pat. No. 4,595,053. U.S. Pat. No. 4,550,782 discloses an annular ring seal which is wedged into an annular space which it tapered downwardly and outwardly as is the ring seal.

It has been common practice in the past to use multiple camming surfaces to wedge slips outward into sealing engagement with the interior of the casing into which the slips are to be set. These structures are disclosed in U.S. Pat. Nos. 2,582,700 and 3,311,168.

When a tubular member is formed outwardly in a liquid environment into a cylindrical fitting having inner grooves into which the tubular member is deformed, U.S. Pat. No. 4,662,663 discloses the use of collapsible material positioned within the grooves to eliminate the problems with the grooves being filled with water and limiting the forming of the tubular member.

SUMMARY

The improved tubing packer of the present invention includes a sleeve connected in the tubing string and having an outer diameter close to the inner diameter of the casing string into which is it to seal and a plurality of external grooves having pressure compensating material therein, a liner within the sleeve and spaced therefrom, pressure responsive means between said sleeve and said liner, the pressure responsive means coacting with the sleeve to force the sleeve outward into tight sealing engagement with the interior of the casing and means for supplying a pressure fluid to the pressure responsive means.

An object of the present invention is to provide an improved downhole tubing packer which provides a metal-to-metal seal against the interior of the casing.

Another object is to provide an improved tubing packer which provides both sealing and gripping engagement with the casing.

BRIEF DESCRIPTION OF THE DRAWINGS

These and other objects and advantages of the present invention are hereinafter set forth and explained with reference to the drawings wherein.

DESCRIPTION OF THE PREFERRED EMBODIMENT

Figure 1:
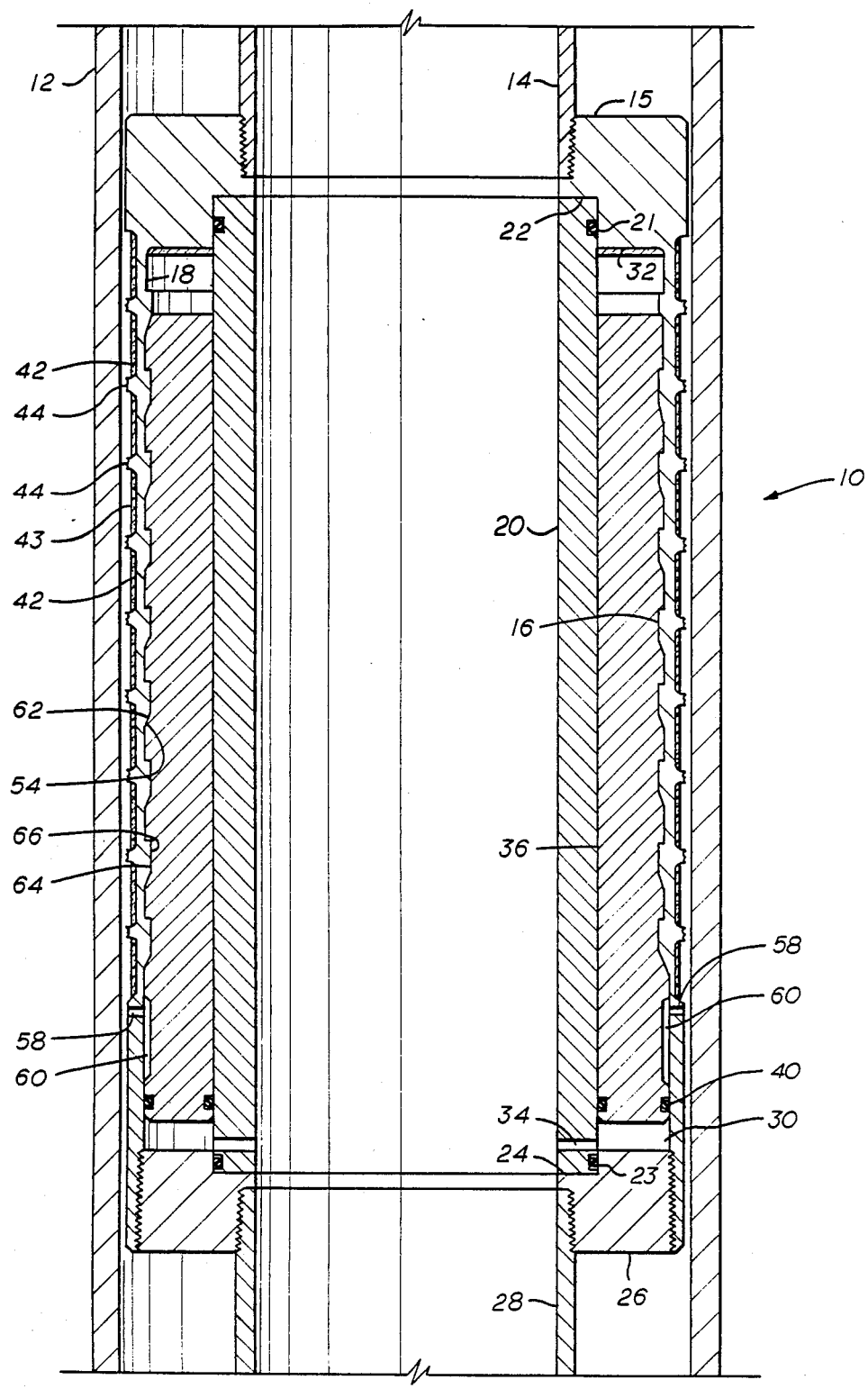
FIG. 1 is a partial sectional view of the improved packer positioned within a well bore at the level at which it is to be set against the interior of the casing.
Figure 2:
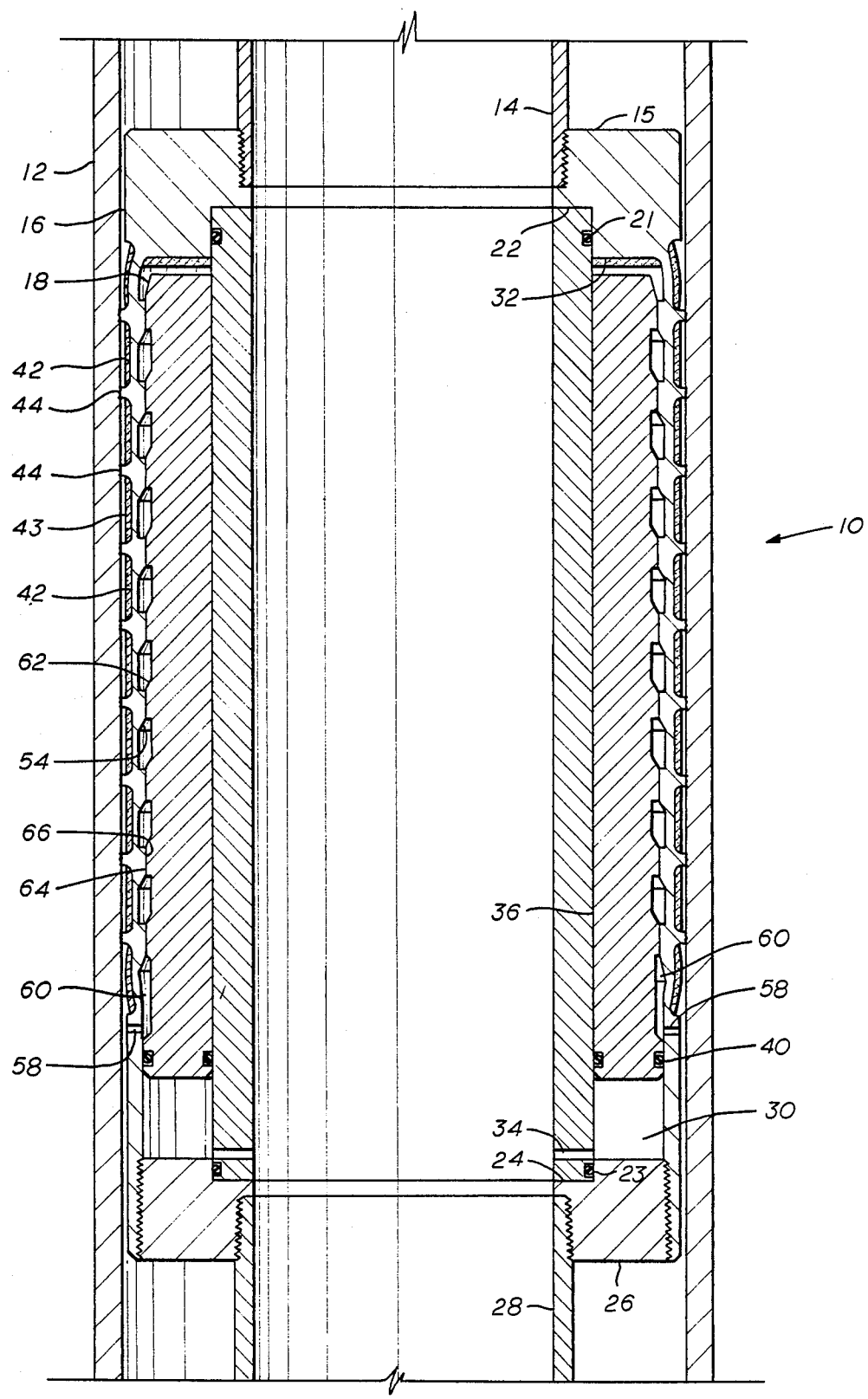
FIG. 2 is a partial sectional view of the improved packer set into sealing engagement with the interior of the casing.

As shown in FIG. 1, improved sealing packer 10 of the present invention is shown positioned within well string 12 at the level at which it is to be set. Sealing packer 10 is run into the well on tubing string 14 which threads into upward facing flange 15 of sleeve 16. Sleeve 16 includes internal annular recess 18 and liner 20 is positioned between upper downwardly facing inner shoulder 22 in the interior of flange 15 and lower upwardly facing shoulder 24 on the closure ring 26 which is threaded into the lower end of sleeve 16. Tubing string 28 below sealing packer 10 is threaded into the interior of closure ring 26. Annular space 30 is formed between the exterior of liner 20 and the interior of sleeve 16 below shoulder 32 at the upper end of recess 18 and the upper surface of closure ring 26. Port 34 extending through the lower portion of liner 20 to provide communication into the lower portion of annular space 30. Annular piston 36 is positioned within annular space 30 and includes inner and outer seals 38 and 40 for sealing against the interior of the lower portion of sleeve 16 and against the exterior of liner 20. The upper end of liner 20 is sealed to flange 15 by O ring 21 and the lower end is sealed to closure ring 26 by O ring 23.

Figure 3:
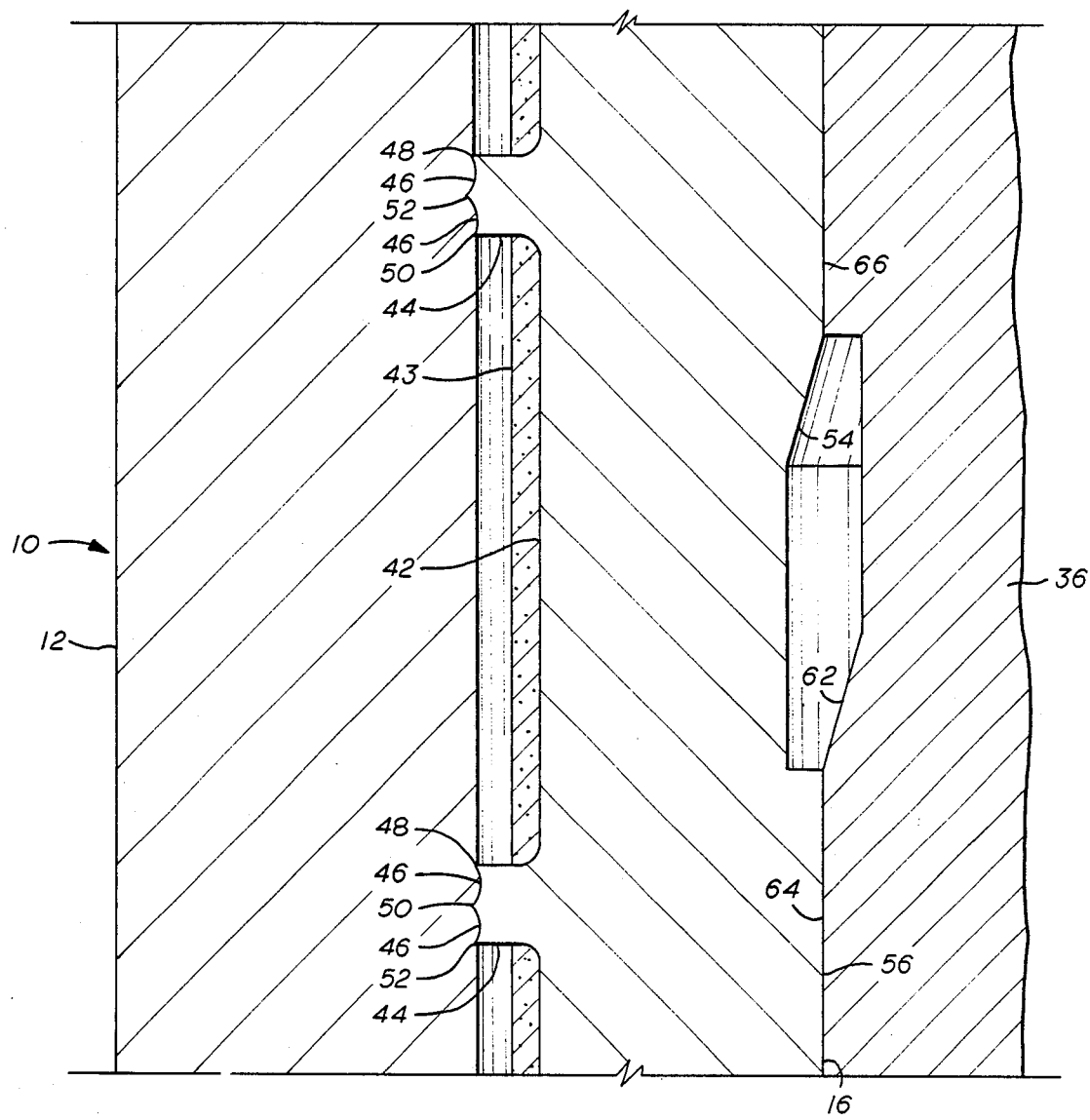
FIG. 3 is an enlarged detail sectional view of two of the grooves and the land between the groove and showing its engagement with the interior of the casing.

The exterior surface of sleeve 16 includes a plurality of grooves 42 which are at least partially filled with pressure compensating material 43, such as microspheres in an epoxy matrix or in syntatic form. Lands 44 between grooves 42 are best seen in FIG. 3 wherein it is shown that lands 44 have a pair of shallow grooves 46 which provide upper annular sharp peak 48, lower annular sharp peak 50 and intermediate annular peak 52. The inner surface of sleeve 16 includes multiple inner camming surfaces 54 in the area of sleeve 16 within the area of grooves 42 on the exterior of sleeve 16. Surface 56 immediately above closure ring 26 is smooth to allow sealing of outer seal 40. Ports 58 extend through sleeve 16 at a level above the highest level of seal 40 and is provided to communicate with groove 60 in the lower outer surface of piston 36 to provide for pressure equalization which is needed responsive to the movement of piston 36 to ensure that its movement is not impeded by a pressure lock. Piston 36 includes external multiple outer camming surfaces 62 which mate with camming surfaces 54 on the interior of sleeve 16.

Setting of sealing packer 10 is accomplished by pressuring tubing string 14 so that fluid under pressure flows through ports 34 and into annular space 30 below piston 36. The pressure under piston 36 forces it upwardly causing camming surfaces 54 and 62 to coact forcing sleeve 16 outward into tight gripping and sealing engagement with the interior of well string 12 to create a positive metal-to-metal seal and also an anchoring of sealing packer 10 to well string 12. The engagement of sleeve 16 with the interior of well string 12 is clearly shown in FIG. 3. As can be seen from the drawing, sharp peaks 48, 50 and 52 of lands 44 actually deform the interior surface of well string 12 by digging therein as shown in the drawing.

With sealing packer 10 set as described above, the relieving of pressure supplied to annular space 30 does not cause the downward movement of piston 36 since it has moved sufficiently far so that its outer cylindrical surfaces 64 are engaged by inner cylindrical surfaces 66 of sleeve 16 so that there no tapered surfaces in the camming surfaces in engagement between piston 36 and sleeve 16 which might cause any reversing forces on piston 36. Thus, improved sealing packer 10 is set into tight gripping and sealing metal-to-metal engagement with the wall of well string 12 within which it is positioned.

What is claimed is:

1. A downhole tubing packer comprising
   a sleeve having an internal recess, a plurality of external annular grooves, a plurality of lands between said external annular grooves and internal multiple camming surfaces,
   means closing said internal recess to provide an annular space within said sleeve,
   a piston movably positioned within said annular space,
   said piston having external multiple camming surfaces coacting with said internal multiple camming surfaces of said sleeve, and
   means for delivering fluid under pressure to one end of said annular space for movement of said piston therein,
   movement of said piston responsive to fluid pressure forcing said sleeve outward into tight sealing and gripping engagement with the interior surface of a string against which it is to seal with the lands between the sleeve grooves digging into such interior surface.

2. A tubing packer according to claim 1 including a pressure compensating material at least partly filling said sleeve grooves.

3. A tubing packer according to claim 2 wherein said pressure compensating material being microspheres in a suitable matrix.

4. A tubing packer according to claim 3 wherein said matrix is an epoxy.

5. A tubing packer according to claim 3 wherein said matrix is a syntatic foam.

6. A tubing packer according to claim 1 wherein the lands between said sleeve grooves include sharp projections to dig into the interior surface.

7. A tubing packer according to claim 1 wherein the exterior surface of the lands between said sleeve grooves include an shallow upper annular groove and a lower shallow annular groove.

8. A tubing packer according to claim 1 including a string connected to the upper end of said sleeve, and a port extending from the interior of the means closing said recess into said annular space, and said means supplying fluid pressure being through said string and said port.

9. A tubing packer according to claim 1 wherein said camming surfaces on said sleeve and said piston include the cam surfaces which taper with respect to the axes of said sleeve and piston and are alternated with inner and outer cylindrical surfaces.

10. A tubing hanger comprising
    an outer sleeve having a plurality of external annular grooves, multiple internal camming surfaces and an axially extending internal recess,
    a liner positioned within said sleeve,
    means coacting with said sleeve and said liner forming an annular space within said sleeve,
    a piston movably positioned within said annular space and having external multiple camming surfaces to coact with the sleeve camming surfaces, and
    means for delivering fluid under pressure to said annular space to move said piston axially therein,
    axial movement of said piston camming said sleeve outwardly with sufficient force to create a positive gripping and sealing engagement with a surface surrounding the exterior of said sleeve.

* * * * *